United States Patent [19]
De La Garza

[11] 3,765,643
[45] Oct. 16, 1973

[54] NON-DRIP FAUCET VALVE
[76] Inventor: Jesus De La Garza, c/o P. O. Box 18948, Cimerron Station, Los Angeles, Calif. 90018
[22] Filed: July 17, 1972
[21] Appl. No.: 272,689

[52] U.S. Cl. .................................. 251/38, 251/44
[51] Int. Cl. ........................................... F16k 31/44
[58] Field of Search ........................... 251/38, 43, 44

[56] References Cited
UNITED STATES PATENTS
| 2,047,120 | 7/1936 | Stout | 251/44 |
| 2,211,237 | 8/1940 | Langdon | 251/43 X |
| 2,574,488 | 11/1951 | Langdon | 251/38 X |

Primary Examiner—Harold W. Weakley

[57] ABSTRACT

A non-drip faucet valve comprising a hollow valve housing provided with an interior fluid-pressure-expandable valve means connected between a valve seat means and a valve-actuating member and arranged to be in interior communication with pressurized water (or other liquid or fluid) whereby to automatically expand said fluid-pressure-expandable valve means in a space defined between said valve-actuating member and said valve seat means and to sealingly engage a sealing portion of said valve seat means in a manner preventing the outflow of water (or other liquid or fluid) past the sealingly engaged fluid expanded valve means and the sealing portion of said valve seat means whenever the valve-actuating member is within a predetermined distance of said valve seat means. The fluid-pressure-expandable valve means is arranged to effectively move into a non-expanded contracted relationship whenever said valve-actuating member is moved to a position more than a predetermined distance from said valve seat means whereby to disengage said valve means from the sealing portion of said valve seat means and to effectively temporarily override the self-expansion operation of said fluid-pressure-expandable valve means for as long as said valve-actuating member is beyond said predetermined distance from said valve seat means whereby to permit the outflow of water (or other liquid or fluid) past the disengaged valve means and valve seat means.

12 Claims, 8 Drawing Figures

PATENTED OCT 16 1973   3,765,643

NON-DRIP FAUCET VALVE

SUMMARY OF THE INVENTION

Generally speaking, the non-drip faucet valve of the present invention may be said to comprise a hollow valve housing means having inlet means and outlet means connected thereto and having an interior chamber provided with and controllably longitudinally movably receiving a controllably longitudinally movable valve-actuating member which is provided with an actuating handle means at a remote portion thereof exterior of the valve housing means. The apparatus also includes effectively apertured valve seat means positioned in spaced opposition to said valve-actuating member and defining therebetween a valve recess, with said valve seat means including an inflow portion in effective communication with said inlet means and an outflow portion in effective communication with said outlet means and intervening (usually annular) sealing means or sealing portion of said valve seat means positioned effectively between said inflow and outflow portions. The apparatus also includes fluid-pressure-expandable valve means having a first portion abuttable with said valve-actuating member and having a second separate portion defining with said first portion a hollow interior expansion chamber within said valve means which is provided with communication means in communication with said inflow portion of said effectively apertured valve seat means, said second valve means portion being positionable adjacent to said valve seat means and being forcibly sealingly abuttable with said sealing means of said valve seat means as a result of interior fluid pressure within said expansion chamber when said valve-actuating member is within a predetermined distance from valve seat means. In a preferred form of the invention, the above-mentioned by-pass means comprises egress bleed-hole aperture means effectively including a passage-defining rod passing through said second valve means portion from said expansion chamber to said outflow portion of said apertured valve seat means and defining a reduced-size bleed passage extending between the interior of said expansion chamber and said outflow portion of said apertured valve seat means and adapted to be effectively closed by said closure means whenever said second valve means portion is in sealing engagement with said sealing means portion of said apertured valve seat means and to be effectively oped by said closure means whenever said second valve-actuating member is moved beyond said predetermined distance from said valve seat means and whenever said second valve means portion is in open relationship with respect to said sealing means portion of said apertured valve seat means. Also in said preferred form, said passage-defining rod is carried by said valve-actuating member and extends longitudinally through said fluid-pressure-expandable valve means toward said outflow portion of said apertured valve seat means.

In one preferred form, the hereinbefore-mentioned communication means comprises aperture means effectively extending between the inflow means and the interior of said expansion chamber means in a manner effectively communicating same at all times. In one preferred version of said communication means, said aperture means thereof extends through said second valve means portion between the inflow portion of said apertured valve seat means into the interior of said expansion chamber means and comprises a total effective inflow aperture area substantially greater than the total effective outflow aperture area provided by said by-pass means.

The above generally described construction of the novel non-drip faucet valve compensates for the customary valve leakage which occurs in conventional hot-water faucet valves (or valves for other hot liquids or fluids) because of contraction of various parts of the valve and actuating means as a result of cooling subsequent to the initial closing of the valve. Such leakage will not occur in the novel valve of the present invention because the fluid pressure within the expandable valve means will maintain an effective sealing engagement of the expandable valve means with respect to the sealing portion of the valve seat means even after such cooling of the water (or other liquid or fluid) or even after such cooling of the valve seat means, the valve means, and/or the valve-actuating member has occurred in the device of the present invention when used as a hot-water faucet valve (or valve for other hot liquids or fluids.) However, whenever the valve-actuating member is moved beyond a predetermined distance from the valve seat means, the novel by-pass means effectively reduces the pressure of the water or fluid within the interior chamber of the expandable valve means by communicating same with an outlet pipe, nozzle, or spout so that the greater inlet pressure of the water (or other liquid or fluid) acting against the outside of the expandable valve means will effectively collapse said expandable valve means to an extent just sufficient to move the portion thereof which has previously engaged the sealing portion of the valve seat means away from said valve seat means in a manner such as to allow controlled egress of water (or other liquid or fluid) past the collapsed valve and the spaced valve seat means into the outlet pipe, nozzle, or spout. Thus, the valve operates in a conventional manner during opening and closing movement thereof, but, when closed, the fluid-pressure-expandable characteristic of the valve means takes over and maintains a positive sealing closure of the valve irrespective of any contraction of various parts thereof as a result of temperature changes.

OBJECTS OF THE INVENTION

It is an object of the present invention to provide a novel non-drip faucet valve of the type referred to above which will effectively maintain a non-leaking closed relationship of the valve means with respect to the valve seat means irrespective of temperature and/or pressure changes.

It is a further object to provide a novel non-drip valve structure of the character referred to above which includes a fluid-pressure-expandable valve means arranged whenever the valve-actuating member is in one position, to be fully expanded by interior water, liquid, or fluid pressure whereby to seal off the sealing portion of a valve seat means and arranged, whenever the valve-actuating member is in another position, to effectively collapse whereby to disengage itself from the valve seat means to allow the free passage of water or other liquid or fluid.

It is a further object to provide a novel, non-drip valve means of the type referred to above which can be used wherever such a non-leaking valve would be advantageous and which is not specifically limited to a faucet valve, although this is one exemplary and highly advantageous application of the improved non-drip valve means of the present invention.

It is a further object of the present invention to provide a novel self-compensating, non-drip valve structure of the character referred to herein, generically and/or specifically, and which may include any or all of the features referred to herein, either individually or in combination, and which is of extremely simple, inexpensive, easy-to-manufacture construction such as to be suitable for ready large-scale manufacture and distribution at relatively low-cost, both as to the initial cost (including tooling and production set-up costs, etc.) and as to be the subsequent perunit manufacturing costs whereby to be conducive to said widespread production, distribution, sale, and use of the invention for the purposes outlined herein or for any substantially equivalent or similar purposes.

Further objects are implicit in the detailed description which follows hereinafter (which is to be considered as exemplary of, but not specifically limiting, the present invention,) and said objects will be apparent to persons skilled in the art after a careful study of the detailed description which follows:

For the purpose of clarifying the nature of the present invention, several exemplary embodiments of the invention are illustrated in the hereinbelow-described figures of the accompanying single drawing sheet and are described in detail hereinafter.

Figure 2:
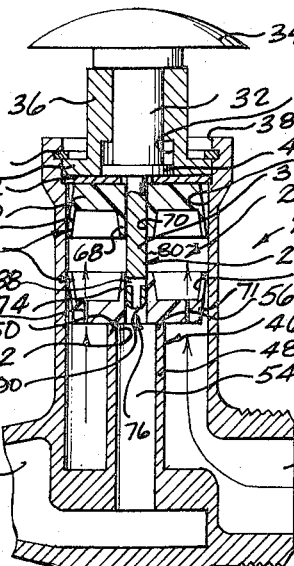
FIG. 2 is a fragmentary view comprising a vertical sectional view taken largely on a vertical central plane through the exemplary first form of the invention comprising the elements shown in exploded relationship in FIG. 1. In this view, the entire valve structure is shown in closed relationship.
Figure 3:
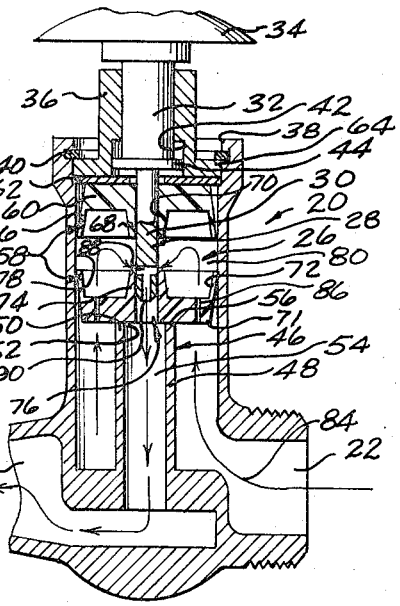

FIG. 3 is a fragmentary, vertical plane, sectional view similar to FIG. 2, but illustrates the apparatus after the valve-actuating member has been moved very slightly upwardly to start the sequence of events comprising a valve-opening operation, which is shown only partially completed in this view since the lower portion of the fluid-pressure-expandable valve means is still shown in sealing engagement with the valve seat means similar to the showing of FIG. 2. However, in this view the by-pass means is partially open and the high water pressure within the interior chamber within the fluid-pressure-expandable valve means is shown in the process of being reduced by being communicated to the outlet means, which will very shortly thereafter create sufficient upwardly directed differential pressure acting across the lower part of said valve means to cause it to move upwardly away from the valve seat means in a manner effectively opening the entire valve structure and directly communicating the inflow and outflow portions thereof in the manner shown in FIG. 4.

Figure 4:
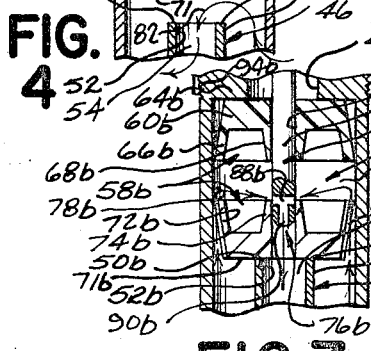

FIG. 4 is a fragmentary view similar to FIG. 3, but illustrates the immediately succeeding step referred to above in the description of FIG. 3 wherein the upward acting differential pressure has collapsed the fluid-pressure-expandable valve means and has directly communicated the inflow and outflow portions of the apparatus, followed by further valve-opening movement of the valve-actuating member.

Figure 5:
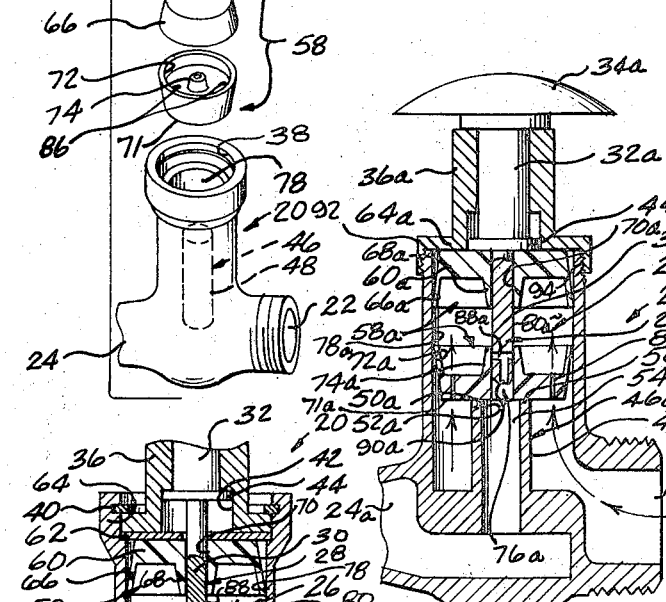

FIG. 5 is a fragmentary, vertical-plane, sectional view generally similar to FIG. 2, but illustrates a slight modification thereof facilitating the assembly of the valve parts.

Figure 6:
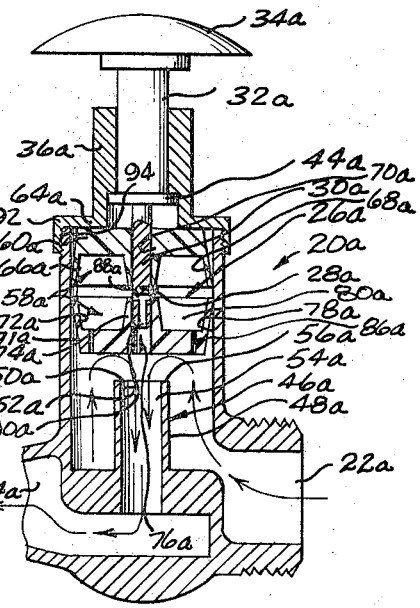

FIG. 6 is a view similar to FIG. 4, but is of the slightly modified type of valve structure shown in FIG. 5.

Figures 7, 8:
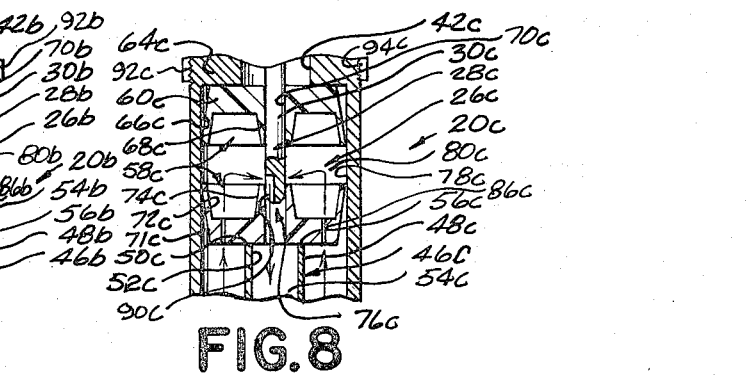

FIG. 7 is a fragmentary view generally similar to a central portion of FIG. 3, but illustrates a slight modification wherein the communication means communicating the high pressure from the inlet or inflow means with the interior chamber inside of the fluid-pressure-expandable valve means is of a modified type and wherein the housing construction is of the modified type shown in FIGS. 5 and 6.

FIG. 8 is a fragmentary view similar to the central portion of FIG. 3 wherein the by-pass means for reducing pressure within the interior chamber of the fluid-pressure-expandable valve means during the intermediate phase of a valve-opening operation is slightly modified from the showing of FIG. 3 and wherein the housing construction is of the modified type shown in FIGS. 5 and 6.

Referring to FIGS. 1–4 for exemplary purposes, one illustrative embodiment of the invention is shown in said figures in a typical illustrative form wherein it comprises a hollow valve housing means, such as is generally designated by the reference numeral 20 having inlet means 22 and outlet means 24 connected thereto and having an interior chamber, indicated generally at 26, positioned within the housing means 20.

The hollow valve housing means 20 carries therein a longitudinally movable valve actuating member 28 indicated generally at 28, which is shown as comprising a lower rod 30 connected to an extended longitudinal stem portion 32 which is adapted to be provided with an actuating handle means 34 at its remote end (in the example illustrated, the upper end) at a location exterior of the housing means 20. In the example illustrated, the longitudinal stem portion 32 is longitudinally slidably mounted within an exterior sleeve portion 36 which is adapted to be fastened into the open upper end 38 of the housing means 20 by a resilient snap ring or retaining rig 40, although not specifically so limited. In the example illustrated, the sleeve 36 has an enlarged bore 42 at its lower end in which an enlarged disc 44 carried at the junction of the rod 30 and the stem portion 32 is positioned for movement between either of the two extreme positions shown in FIGS. 2 and 4 or any intermediate position. In other words, in the example illustrated, the stem 32, the enlarged disc 44, and the rod 30 are all longitudinally slidably and frictionally mounted for movement between fully closed relationship as shown in FIG. 2 and fully open relationship as shown in FIG. 4, as desired, by merely grasping the actuating handle 34 and applying sufficient force thereto to longitudinally slidably move the actuating handle 34 to any desired position.

The valve housing means 20 is also provided with effectively apertured valve seat means positioned in spaced opposition to the valve actuating member 28 and, in particular, to the lower end of the rod 30 of the valve-actuating member 28 and in a concentric relationship with respect thereto. In the example illustrated, said valve seat means is generally designated by the reference numeral 46 and comprises what might be termed a hollow upstanding pipe 48 having an open upper end comprising said valve seat means 46 and having an outer exterior part 50 which may be said to effectively comprise an inflow portion of said valve seat means in communication with the inlet means 22, and also having an inner part 52 which may be said to comprise an outflow portion of the valve seat means 46 which is in effective communication with the outlet means 24 by way of the hollow interior 54 of the outlet pipe means 48. The top open end of the pipe 48 of the valve seat means 46 may be said to comprise an annular sealing means or edge, indicated at 46, of the valve seat means 46 positioned between the inflow and outflow portions 50 and 52 thereof.

Figure 1:
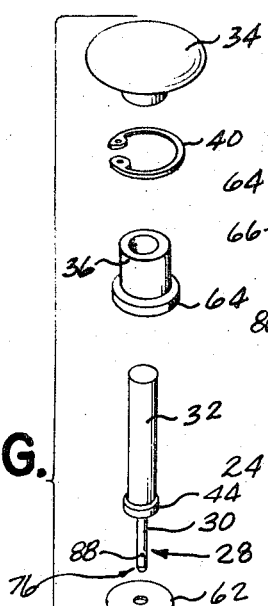
FIG. 1 is an exploded perspective view illustrating the various elements of one exemplary form of the invention which are shown in fully assembled relationship in the sectional views comprising FIGS. 2–4 inclusive.

The hollow interior 26 of the valve housing means 20 also carries fluid-pressure-expandable valve means, indicated generally at 58, (as best shown in FIG. 1) having a first portion 60 abuttable with the effective closed top of the hollow interior 26 of the valve housing means 20, which, in the example illustrated, comprises a washer-like member 62 resting under the bottom flange 64 of the previously mentioned sleeve 36 comprising the effective top of the hollow housing means 20. The first, or top, portion 60 of the fluid-pressure-expandable valve means 58 comprises a downwardly open, elastomeric cup member, also designated by the reference numeral 60, having an outer, downwardly directed edge flange 66 and a central, downwardly directed edge flange 68 defining a through-aperture 70 through which the rod 30 sealingly passes for relative longitudinal sliding movement therethrough in response to actuation of a handle 34.

The fluid-pressure-expandable valve means 58 has a second and, in the example illustrated, lower elastomeric cup member 71 which, in this case, is upwardly open, and which has an outer, upwardly directed edge flange 72 and a central, upwardly directed, apertured flange 74 adapted to receive the lower end of the rod 30 therein in either a fully closed position as shown in FIG. 2 or a partially open position as shown in FIGS. 3 and 4 for effectively providing what might be termed closure means for the by-pass means indicated generally at 76 and which will be described in greater detail hereinafter.

The opposed hollow cup members 60 and 71 together comprise the above-mentioned fluid-pressure-expandable valve means 58 and are adapted to assume either an effectively expanded relationship, as shown in FIG. 2 (where said by-pass means 76 is fully closed,) and an effectively collapsed position, as shown in FIGS. 3 and 4 (in varying degrees of proximity, however,) where said by-pass means is open.

It should be noted that the interior wall 78 of the housing means 20 effectively comprises what might be termed mounting means for mounting the expandable valve means 58 for longitudinal slidable movement of the bottom portion 71 thereof with the corresponding movement of the valve-actuating member 28 so as to provide for opening and closing of the entire valve means to any desired extent.

In the example illustrated, the previously-mentioned by-pass means 76 comprises a by-pass passage adapted to effectively communicate the hollow interior expansion chamber 80 between the two portions 60 and 71 of the expandable valve means 58 with the outflow portion 52 of the valve seat means 46 whenever the closure means 74 is in the open relationship shown in FIGS. 3 and 4, which will have the effect of reducing the interior fluid pressure within the expansion chamber 80 so that the lower member 71 will move from its previous positively seated relationship shown in FIG. 2 into an unseated relationship such as is about to be produced by the unbalanced net upward-acting differential force exerted across the bottom valve member 71 when the apparatus is in the condition shown in FIG. 3. This will cause the lower valve member 71 to move upwardly away from the valve seat means 46 as a consequence of any further upward movement of the actuating handle 34 so that the inflow and outflow portions 50 and 52 will, in effect, no longer be sealed from each other by the lower valve member 71, thus directly communicating the inlet and outlet means 22 and 24 so as to allow flow therethrough in the manner indicated by the arrow 82 of FIG. 4. It should be clearly noted that the arrows 84 of FIG. 3 do not indicate that the valve is open and that substantial flow of liquid therethrough can occur. Said arrows merely indicate that high inlet pressure water can flow through the communication means 86 into the interior expansion chamber 80 so as to pressurize same and that the by-pass means 76 allows pressure to be dumped from the expansion chamber 80 at precisely the same rate as it is built up through the communication means 86, thus maintaining a balanced condition so that further upward movement of the actuating handle 34 will cause the bottom valve portion 71 to move along with the rod member 30 upwardly toward a fully open position such as is shown in FIG. 4 or to any intermediate, partially open position between the positions shown in FIGS. 3 and 4.

It should be noted that when the actuating handle 34 is moved downwardly to its lower extreme closed position as shown in FIG. 2, the closure means 74 completely closes off the by-pass means 76, thus preventing any outflow of pressure into the hollow interior 54 of the outflow tube 48, while the high inlet pressure feeding through the communication means 86 into the interior expansion chamber 80 remains in effect, thus producing an increase in interior chamber presure and a net downward acting differential pressure across the lower valve member 71 so as to positively force it into firm sealing engagement with the annular sealing portion 56 of the valve seat means 46 irrespective of any contraction of the parts of the valve which may have occurred after it was initially closed.

In other words, even if the valve is hand-closed and is initially sealed while hot (such as in the case of a hot water faucet valve) and subsequently contracts as a result of cooling of the parts so that the valve would normally tend to become slightly unseated and to drop or leak, this will not occur in the novel valve of the present invention because of the differential pressure acting downwardly across the bottom valve part 71, which will compensate for any such contraction which might occur. When the valve means 58 is in this condition, it is referred to as in the expanded condition. Conversely, when the valve means 58 allows the by-pass means 76 to be open, the fluid pressure expandable valve means 58 is then considered to be in the contracted or retracted relationship such as is shown in FIGS. 3 and 4, while the expanded relationship is shown in FIG. 2.

The by-pass means, indicated generally at 76, comprises bleed hole aperture means or bleed passage means effectively passing through the second or lower valve means portion or cup 71 from the interior expansion chamber 80 within the fluid-pressure-expandable valve means 58 to a low pressure region which, in the example illustrated, comprises the outflow portion 52 of the valve seat means 46, or the hollow interior 54 of the outelt pipe 48.

It should be clearly understood that in the first exemplary form of the invention illustrated, the by-pass means 76 comprises the transversely directed, double-ended bleed-hole aperture 88 carried by the rod 30 at a position near its lower end and communicating with a longitudinally directed central bore hole or bleed passage 90 which extends downwardly through the bottom end of the rod 30. It should also be noted that the previously described central, upwardly directed elastomeric flange, comprising the previously-referred to closure means 74, is so positioned and is of a vertical extent or height such that when the lower valve means portion or cup member 71 is firmly seated on the annular sealing means or end 56 of the valve seat means 46 in the manner clearly shown in FIG. 2, said closure means 74 fully covers, seals, and closes off the transverse bleed-hole aperture 88 of the by-pass means 76 so it can be said that the complete by-pass means 76 is fully closed when the entire valve structure is in the fully closed position shown in FIG. 2.

However, it should be noted that the location of the transversely directed bleed-hole aperture means 88 and the upper end of the flexible elastomeric closure means 74 are such that when the actuating handle 34 is moved slightly upwardly from the fully sealed position shown in FIG. 2 into the next pre-valve-opening position shown in FIG. 3, said transversely directed bleed-hole aperture means 88 becomes partially disengaged from the upper end of the closure means 74, thus, in effect, partially opening the by-pass means 76 so that water or other fluid within the chamber 80, which is virtually at the inlet pressure of water entering by way of the inlet 22, is now allowed to escape through the partially open by-pass means 76 into the low pressure outflow portion 52 of the valve seat means 46 and into the hollow interior 54 of the outflow or outlet pipe means 48 in the manner clearly shown in FIG. 3. This causes a reduction in pressure acting downwardly on the upper side of the lower valve means portion or cup 71, while the pressure acting upwardly thereagainst remains the same. The two pressures come to a balanced condition by reason of th extent of the opening of the by-pass means 76 in relation to the fixed effective total cross-sectional aperture area of the communication means 86 through which high pressure inlet water is constantly being communicated from the inlet means 22 to the interior chamber 80. In other words, in the preferred first form of the invention illustrated, the by-pass means 76 has an effective cross-sectional aperture, when fully open, which is substantially greater than the total effective cross-sectional aperture area of the communication means 86. Thus, it will be seen that if the by-pass means 76 were allowed to open fully, it would dump pressure from the interior of the chamber 80 faster than it is built up through the communication means 86. This would immediately cause the lower valve means portion or cup member 71 to be moved upwardly as a result of the net upward-acting differential pressure, which would, in turn, partially close off the by-pass means 76 until the loss of pressure therethrough exactly matches the increase of pressure produced by way of the input communication means 86. This is what is meant by the balanced condition referred to hereinbefore and when this condition is achieved, any further upward movement of the actuating member 34 will cause the lower valve means portion or cup member 71 to move upwardly with the actuating handle 34 so as to maintain the same relative position with respect to the by-pass 76 and to thereby maintain the same extent of partial opening or closing thereof which produces the above-mentioned balanced condition.

Thus, as the actuating handle 34 is moved upwardly from the position whown in FIG. 3, the lower valve means portion or cup member 71 will also move upwardly, fully disengaging it from the sealing end 56 of the valve seat means 46, so as to provide a positive and direct communication between the inlet means 22 and the outlet means 24, as is shown in fragmentary form in FIG. 4.

Conversely, when the actuating handle 34 is returned to the closed position shown in FIG. 2, the closure means 74 is moved over the transverse bleed hole aperture means 88 and fully closes the by-pass means 76, and the above-mentioned balanced condition no longer esists since now only inlet pressure is applied to the interior chamber 80 by way of the communication means 86, and there is no loss of pressure through the by-pass means 76, since it is closed. This is the condition shown in FIG. 2 and results in a positive maintenance of sealed engagement of the lower valve means portion or cup member 71 against the annular sealing end or portion 56 of the valve seat means 46 irrespective of any contraction or expansion which may subsequently occur (usually as a result of temperature changes.)

In the example illustrated, the communication means 86 merely comprises two small through-holes through the bottom wall of the bottom valve means portion or cup member 71 having a total effective cross-sectional area substantially less than that of the by-pass means (usually of the order of approximately one-half that of the by-pass means, although not specifically so limited.) However, it should be noted that the number of communication means holes 86, their locations and/or their sizes are not to be construed as being limited to the specific arrangement illustrated, buy may assume any of a variety of substantially functionally equivalent forms, sizes, and/or locations.

FIGS. 5 and 6 illustrate a slight modification of the valve structure shown in FIGS. 1–4, but in this case being slightly differently constructed and, therefore, providing for simpler assembly of the parts thereof. Because it does illustrate a modification, even though only very slightly different, parts which are either identical or similar to those of the first form of the invention are designated by the same reference numerals, followed by the letter a, however. In this modification, it will be noted that the major change is in the means for attaching the top closure member or sleeve member 36a to the cylindrical housing 20a. In the FIGS. 5 and 6 variation, the sleeve member 36a is provided with what might be termed an interiorly threaded cap or bonnet member 92 which is adapted to be threadedly engaged on exterior threads 94 carried around the periphery of the top wall of the cylindrical housing means 20a. This makes it possible to assemble all moving parts of the valve relative to the bonnet member 92 while it is completely disengaged from the cylindrical housing side wall 20a and to then insert all of the interior parts of the valve means within the cylindrical housing side wall 20a and, at the same time, to threadedly engage the bonnet 92 on the exterior threads 94 and to tighten same into place in a position such as is clearly shown in FIGS. 5 and 6. The outer flange 66a of the upper expandable valve means portion or cup member 60 provides effective sealing for the threaded junction of the bonnet 92 and the exterior threads 94 so that no additional sealing is required. Otherwise, the modification shown in FIGS. 5 and 6 is essentially the same as the first form of the invention and, therefore, no further detailed description thereof is thought necessary or desirable.

FIG. 7 is a slight modification of the form shown in FIGS. 5 and 6 although it is also illustrative of a corresponding slight modification of the first form of the invention shown in FIGS. 1-4. Therefore, parts which are either similar or identical to corresponding previously described parts of the invention are designated by similar reference numerals, followed by the letter b, however. In the FIG. 7 modification, the major change lies in the communication means 86b which, in this case, for illustrative purposes, are shown as being provided at the outer periphery of the engagement region or interface between the outer flange 72b of the lower valve means portion or cup member 71b and the inside surface 78b of the cylindrical side wall of the housing means 20b so that the inflow of high inlet pressure into the interior chamber 80b occurs in said interface region or zone rather than by way of inwardly positioned holes of the type shown at 86 in FIGS. 1-4 and 86a in FIGS. 5 and 6. It should also be noted that the communication grooves 86b may be positioned along the interior surface of the metal side wall of the housing means 20b or along the outside surface of the cup member flange 72b and either arrangement or any combination thereof is intended to be fully disclosed by the showing of FIG. 7 supplemented by this description thereof. Otherwise, the FIG. 7 modification is very similar to the FIGS. 5 and 6 slight variation of the first form of the invention and, therefore, no further and more detailed description thereof is though necessary or desirable.

FIG. 8 is a further slight modification of the FIGS. 5 and 6 variation of the first form of the invention, but is also intended to be representative of a similar modification of the first form shown in FIGS. 1-4 inclusive. Therefore, parts which are identical or similar to previously described parts are designated by similar reference numerals, followed by the letter c, however. It should be noted that the only change in this very slight modification is the slightly changed structure of the by-pass means 76c which does not have a complete lateral, transversely directed bleed hole aperture similar to that shown at 88 in the first form of the invention or at 88a in the very slight variation thereof shown in FIGS. 5 and 6. Otherwise, this modification is similar to the first and second forms of the invention and, therefore, no further and more detailed description thereof is thought necessary or desirable.

It should be noted that various elements of the various illustrative and representative forms of the invention may be freely interchanged within the broad scope of the disclosure of the present invention and that the actuating handle and the entire structure for operating the actuating member may be modified widely within the broad scope of the present invention. For example, instead of being of a frictional, longitudinally slidable type, the actuating mechanism may include a threaded structure so that the actuating handle 34 is rotated for relatively advancing the actuating member with respect to the valve housing means or for relatively retracting same as a function of the direction of relative rotation of the actuating handle. This type of structure can readily be substituted for the particular actuating structure shown and is intended to be included and comprehended within the broad scope of the present invention as well as are various other substantial functional equivalents. Also, variations in the arrangement and structure of the inlet and outlet means and of the intervening valve seat means are contemplated within the broad scopy of the present invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

What is claimed is:

1. A non-drip faucet valve, comprising: a hollow valve housing means having inlet means and outlet means connected thereto and having a hollow interior provided with and controllably longitudinally movably receiving a controllably longitudinally movable valve-actuating member, said valve-actuating member having an extended longitudinal stem portion adapted to be provided with an actuating handle means at a remote end thereof exterior of said housing means; effectively apertured valve seat means positioned in opposition to said valve-actuating member and defining a valve recess, said valve seat means including an inflow portion in effective communication with said inlet means, an outflow portion in effective communication with said outlet means, and intervening sealing means positioned between said inflow and outflow portions;fluid-pressure-expandable valve means positioned within said hollow interior of said valve housing means and having a first portion longitudinally, slidably, movably, substantially centrally engaged with a first part of said valve-actuating member in a liquid-sealed mamner at a location longitudinally spaced from said first valve means portion and defining with said first valve means portion a hollow interior expansion chamber within said valve means provided with communication means in communication with said inlet means; controllably openable and closable by-pass means effectively carried by said valve-actuating member for effectively by-passing said second valve means portion when open in a manner effectively communicating said hollow interior expansion chamber and said outlet means and, when closed, for effectively completely overriding and sealing said by-pass means whereby to effectively isolate and seal said hollow interior expansion chamber from said outlet means, said by-pass means being provided with closure means operable for effectively closing said by-pass means when said valve-actuating member is moved toward said second valve means portion to or beyond a predetermined relative position with respect thereto and for effectively partially opening said by-pass means when said valve-actuating member is moved away from said second valve means portion to or beyond a relative position with respect thereto.

2. Apparatus as defined in claim 1, wherein said by-pass means comprises bleed passage means positioned for interior communication with said expansion chamber within said valve means when said valve-actuating member is moved away from said valve seat means beyond a predetermined distance, thus allowing the pressurized fluid within the expansion chamber to escape to the outflow portion of said valve seat means and thus allowing inlet fluid pressure from said inlet portion of said valve seat means acting against the outside of said second valve means portion to force it toward said first valve means portion in a manner unseating said second valve means portion from said sealing means of said valve seat means and causing said second valve means portion to assume and subsequently maintain a predetermined longitudinal spacing from said first valve means portion during subsequent movements of said valve-actuating member while said second valve means portion is in open relationship with respect to said sealing means of said apertured valve seat means.

3. Apparatus as claimed in claim 1, wherein said by-pass means has an effective through-aperture area substantially greater than the effective through-aperture area of said communication means whereby the initial opening of said by-pass means by said closure means causes the effective initial outflow of fluid pressure from within said expansion chamber through said by-pass means at a greater rate than the inflow of fluid pressure through said communication means, thus initially causing fluid pressure within said expansion chamber to fall and thus initially allowing inlet fluid pressure from said inlet means to force said second valve means portion toward said first valve means portion in a manner initially unseating said second valve means portion from said sealing means of said apertured valve seat means.

4. Apparatus as defined in claim 2, wherein said by-pass means has an effective through-aperture area substantially greater than the effective through-aperture area of said communication means whereby the initial opening of said by-pass means by said closure means causes the effective initial outflow of fluid pressure from within said expansion chamber through said by-pass means at a greater rate than the inflow of fluid pressure through said communication means, thus initially causing fluid pressure within said expansion chamber to fall and thus initially allowing inlet fluid pressure from said inlet means to force said second valve means portion toward said first valve means portion in a manner initially unseating said second valve means portion from said sealing means of said apertured valve seat means.

5. Apparatus as defined in claim 1, wherein said communication means comprises enlarged aperture means effectively extending between the inlet means and the interior of said expansion chamber means in a manner effectively communicating same at all times.

6. Apparatus as defined in claim 1, wherein said communication means comprises enlarged aperture means effectively extending through said second valve means portion between the inflow portion of said apertured valve seat means and the interior of said expansion chamber means in a manner effectively communicating same at all times.

7. Apparatus as defined in claim 1, wherein said by-pass means comprises egress bleed hole aperture means effectively extending between the interior of said expansion chamber and said outlet means and effectively closed by said closure means whenever said second valve means portion is in sealing engagement with said sealing means of said apertured valve seat means and effectively opened by said closure means whenever said second valve means portion is in open relationship with respect to said sealing means of said apertured valve seat means.

8. Apparatus as defined in claim 1, wherein said by-pass means comprises egress bleed hole aperture means effectively including a passage-defining rod passing through said second valve means portion from said expansion chamber to said outflow portion of said apertured valve seat means and defining a reduced-size bleed passage extending between the interior of said expansion chamber and said outflow portion of said apertured valve seat means and effectively closed by said closure means whenever said second valve means portion is in sealing engagement with said sealing means of said apertured valve seat means and effectively opened by said closure means whenever said second valve means portion is in open relationship with respect to said sealing means of said apertured valve seat means.

9. Apparatus as defined in claim 8, wherein said passage-defining rod comprises a forward portion of said valve-actuating member extending longitudinally forwardly from and comprising an effective projection of the extended longitudinal stem portion adapted to be provided with an exterior actuating handle means and is longitudinally movable therewith.

10. Apparatus as defined in claim 1, wherein said first and second valve means portions are of circular, oppositely directed, cup-shaped similar configurations and comprise two elastomeric, oppositely directed cup members having two oppositely directed substantially circular edge flanges relative telescopically mounted within said hollow valve housing means with respect to each other whereby to define said interior expansion chamber therebetween.

11. Apparatus as defined in claim 1, wherein the inner surface of said second valve means portion has a greater surface area exposed to interior fluid pressure within said expansion chamber when said valve means is in closed relationship to said valve seat means than the area on the opposite side thereof exposed to inlet fluid pressure from said inlet means.

12. Apparatus as defined in claim 1, wherein said closure means is operable when said valve-actuating member forces said second valve means portion into sealing engagement with said sealing means of said apertured valve seat means to forcibly move said second valve means portion a short distance toward said first valve means portion in a manner closing said by-pass means and thus preventing the escape of fluid pressure therethrough from within the expansion chamber whereby to cause inlet fluid pressure from said inlet means and passing through said communication means into the interior of said expansion chamber to increase the fluid pressure within said expansion chamber, whereby to firmly and positively increase the extent of the forcible engagement of said second valve means portion against said sealing means of said apertured valve seat means.

* * * * *